United States Patent
Bruck

(10) Patent No.: US 10,544,869 B2
(45) Date of Patent: Jan. 28, 2020

(54) VALVE

(71) Applicant: HYDAC FLUIDTECHNIK GMBH, Sulzbach/Saar (DE)

(72) Inventor: Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/554,239

(22) PCT Filed: Jan. 29, 2016

(86) PCT No.: PCT/EP2016/000152
§ 371 (c)(1),
(2) Date: Aug. 29, 2017

(87) PCT Pub. No.: WO2016/146228
PCT Pub. Date: Sep. 22, 2016

(65) Prior Publication Data
US 2018/0080568 A1 Mar. 22, 2018

(30) Foreign Application Priority Data
Mar. 19, 2015 (DE) .................. 10 2015 003 554

(51) Int. Cl.
*F15B 13/04* (2006.01)
*F16K 11/07* (2006.01)
(Continued)

(52) U.S. Cl.
CPC ...... *F16K 11/0716* (2013.01); *F16K 31/0613* (2013.01); *F16K 31/0689* (2013.01);
(Continued)

(58) Field of Classification Search
CPC ............. F16K 11/0716; F16K 31/0689; F16K 31/0613; F16K 29/00; Y10T 137/86694;
(Continued)

(56) References Cited

U.S. PATENT DOCUMENTS 4,491,153 A * 1/1985 Bartholomaus .... G05D 16/2013
137/116.3
4,548,383 A * 10/1985 Wolfges ............. G05D 16/2013
137/315.03
(Continued)

FOREIGN PATENT DOCUMENTS

DE 101 33 990 3/2002
DE 10 2010 039 918 3/2012
(Continued)

OTHER PUBLICATIONS

International Search Report (ISR) dated Apr. 29, 2016 in International (PCT) Application No. PCT/EP2016/000152.

*Primary Examiner* — Craig J Price
(74) *Attorney, Agent, or Firm* — Wenderoth, Lind & Ponack, L.L.P.

(57) ABSTRACT

A valve, in particular a proportional pressure regulating valve, has a valve piston (12) longitudinally movable in a valve housing (10) for alternately releasing and connecting a user connection (A) to a pressure supply port (P) or a tank connection (T). The valve piston can be actuated by an actuating magnet (14) that produces a dither signal during operation. The valve piston (12) reaches a floating position within the valve housing (10) by a hydraulic lift limitation for the receipt of the dither signal.

19 Claims, 2 Drawing Sheets

(51) Int. Cl.
*F16K 31/06* (2006.01)
*F16K 29/00* (2006.01)
*F15B 13/044* (2006.01)

(52) U.S. Cl.
CPC ......... *F15B 13/0402* (2013.01); *F15B 13/044* (2013.01); *F15B 13/0407* (2013.01); *F16K 29/00* (2013.01); *Y10T 137/86694* (2015.04); *Y10T 137/86702* (2015.04)

(58) Field of Classification Search
CPC ........... Y10T 137/86702; F15B 13/044; F15B 13/0402; F15B 13/0407
USPC ....................................... 137/625.67, 625.68
See application file for complete search history.

(56) References Cited

U.S. PATENT DOCUMENTS

| | | | |
|---|---|---|---|
| 4,981,159 A * | 1/1991 | Christensen | F15B 13/0417 |
| | | | 137/596.13 |
| 5,996,464 A | 12/1999 | McLevige et al. | |
| 7,926,513 B2 * | 4/2011 | Ishibashi | F15B 13/0407 |
| | | | 137/625.68 |
| 8,607,823 B2 * | 12/2013 | Fischer | F16K 11/0716 |
| | | | 137/625.38 |
| 8,746,276 B2 * | 6/2014 | Bill | B66F 9/22 |
| | | | 137/490 |
| 8,807,519 B2 * | 8/2014 | Bruck | F16K 31/0655 |
| | | | 251/129.19 |
| 9,733,651 B2 * | 8/2017 | Grill | G05D 16/2024 |
| 9,915,276 B2 * | 3/2018 | Bruck | F15B 13/0401 |
| 2004/0046139 A1 | 3/2004 | Graf et al. | |
| 2006/0011878 A1 * | 1/2006 | Denyer | F16K 31/0613 |
| | | | 251/129.08 |
| 2010/0084590 A1 * | 4/2010 | Dayton | F16K 31/0613 |
| | | | 251/129.15 |
| 2012/0048398 A1 | 3/2012 | Schudt et al. | |
| 2012/0049097 A1 | 3/2012 | Morise | |
| 2014/0209826 A1 | 7/2014 | Funakubo et al. | |

FOREIGN PATENT DOCUMENTS

| | | |
|---|---|---|
| DE | 11 2009 004 782 | 10/2012 |
| DE | 10 2012 210 913 | 1/2014 |
| DE | 10 2013 014 452 | 3/2015 |
| EP | 2 733 398 | 5/2014 |
| WO | 02/21032 | 3/2002 |
| WO | 2010/085991 | 8/2010 |
| WO | 2015/028108 | 3/2015 |

* cited by examiner

VALVE

FIELD OF THE INVENTION

The invention relates to a valve, in particular a proportional pressure control valve, comprising a valve piston longitudinally displaceable in a valve housing for alternately releasing and connecting a utility connection or consumer connection A to a pressure supply connection P or a tank connection T. The valve piston being able to be actuated by an actuating magnet, which produces a dither signal during operation.

BACKGROUND OF THE INVENTION

Valves, such as proportional pressure control valves, are very commonly used in mobile work machines for electrohydraulic pilot control of directional valves. One example of such a valve is disclosed in WO 2010/085991 A2.

For "smaller devices", directly controlled proportional pressure control valves are usually sufficient. However, in the case of large construction machines, for example earthmoving machines such as diggers, the directional valves of the working hydraulics reach piston diameters at which pilot control with directly controlled proportional pressure control valves is no longer practical. The large slide valves produce during rapid switching a flow of pilot oil that can no longer be tolerated by the small pilot valves.

For such applications, proportional pressure control valves with corresponding surface ratios are therefore used. These valves have a pressure-effective surface smaller than the piston diameter. The force produced by the control pressure, which acts against the magnetic system usually in the form of an actuating magnet, is then significantly reduced. The large piston can, however, allow the passage of a significantly larger volume flow compared with the directly controlled valve, and thus, drastically reduce, in a desirable manner, the switching times of the large slide valves.

This principle of surface ratios has the significant advantage over a conventional pilot-controlled proportional pressure control valve in that a continuous pilot oil flow is not necessary. The leakage of these valves is extremely low in particular in the flow-free state. This characteristic has significant advantages in the case of emergency supply of the proportional valves with a pressure accumulator. However, a fundamental problem then exists when "filling" the directional valve piston to be actuated. In order to be able to achieve the coverage of the directional valve piston as quickly as possible, specifically when the function is started, the proportional valve is briefly flowed through with a relatively large volume flow. The proportional valve may be switched up to the stroke stop. If the desired slide position is then achieved, the directional piston must however also be held in the achieved position; and the pilot oil flow must consequently abruptly drop to zero. The proportional valve must therefore then move out of its end position back into a central position, whereby the control edge between the pressure supply connection P or pump connection and the utility connection or working connection A is then shut.

Irregularities can arise with the solutions of the prior art. In the stroke end position, the valve piston of the valve is at its mechanical stroke stop. Once this stroke stop has been reached, the dither flow, which is standard in proportional technology, then no longer has the opportunity to transfer the microvibrations of the pilot piston of the actuating magnet, which are standard in other operation, to the valve piston, and thus, to minimize its friction. The dither voltage or the dither flow is, as a dither signal, superimposed on the analogue actuating signal of the actuating magnet for the actuation of the valve piston of the valve. This signal then causes the valve or its piston to always vibrate slightly, so that no stick-slip effect occurs. As a general rule, setting the dither frequency as the frequency of the dither voltage should be possible just like the amplitude of the dither voltage or of the dither flow. Incorrectly set dither signal values lead to rapid wear of the valves. If the valve piston is kept at least briefly in its position inside the valve housing due to increased friction caused by the corresponding absence of the required dither signal from the actuating magnet as a result of increased friction, functional impairments are encountered, in particular in the form of jerky movements of the work machine, which represents a safety hazard.

SUMMARY OF THE INVENTION

On the basis of this prior art, the problem addressed by the invention is to provide an improved valve, while retaining the advantages described above in such a way that no functional impairments of the sort described above can be encountered.

This problem is basically solved by a valve having the valve piston arrive at a floating position inside the valve housing by a hydraulic stroke limit or stop for maintenance of the dither signal. The valve piston is thereby prevented from striking the additionally provided mechanical stroke limit, as has been described in the prior art, with the described negative consequences for the dither signal effect. Because the valve according to the invention now has a hydraulic stroke limit, from a hydraulic perspective an additional control edge has been created, which additional control edge permits a fluidic force build-up on the valve piston. The fluidic force is greater than the effective magnetic force of the actuating magnet acting upon the valve piston, so that the valve piston can be stopped shortly before it reaches the mechanical stroke limit. In this respect, the valve piston then remains floating or in a kind of floating state, and the dither signal effect procured via the actuating magnet is fully maintained. Then, the friction is still minimized, and functional impairments are ruled out in this regard.

In the shut state of the valve and in normal operation with a balanced directional valve piston of the work machine, the additional new control edge of the proportional valve in the form of the hydraulic stroke limit remains fully shut. Then, no increased leakage occurs there either. The advantages of the above described valve principle of the prior art are then retained in full in the new valve solution. Overall, the valve according to the presents a significantly improved actuation behavior of the directional valve piston, and thus, also of the corresponding work machine.

The solution according to the invention then permits significantly improved sensitivity and, at the same time, dynamic actuation behavior of hydraulically pilot-controlled directional valve pistons in proportional pressure control valves. The improvements, in particular, also apply to cold, and thus, highly viscous hydraulic oil. The system-related advantage of the low leakage volumes in the shut state and with a balanced directional valve piston is likewise retained. There is no equivalent of this solution in the prior art.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
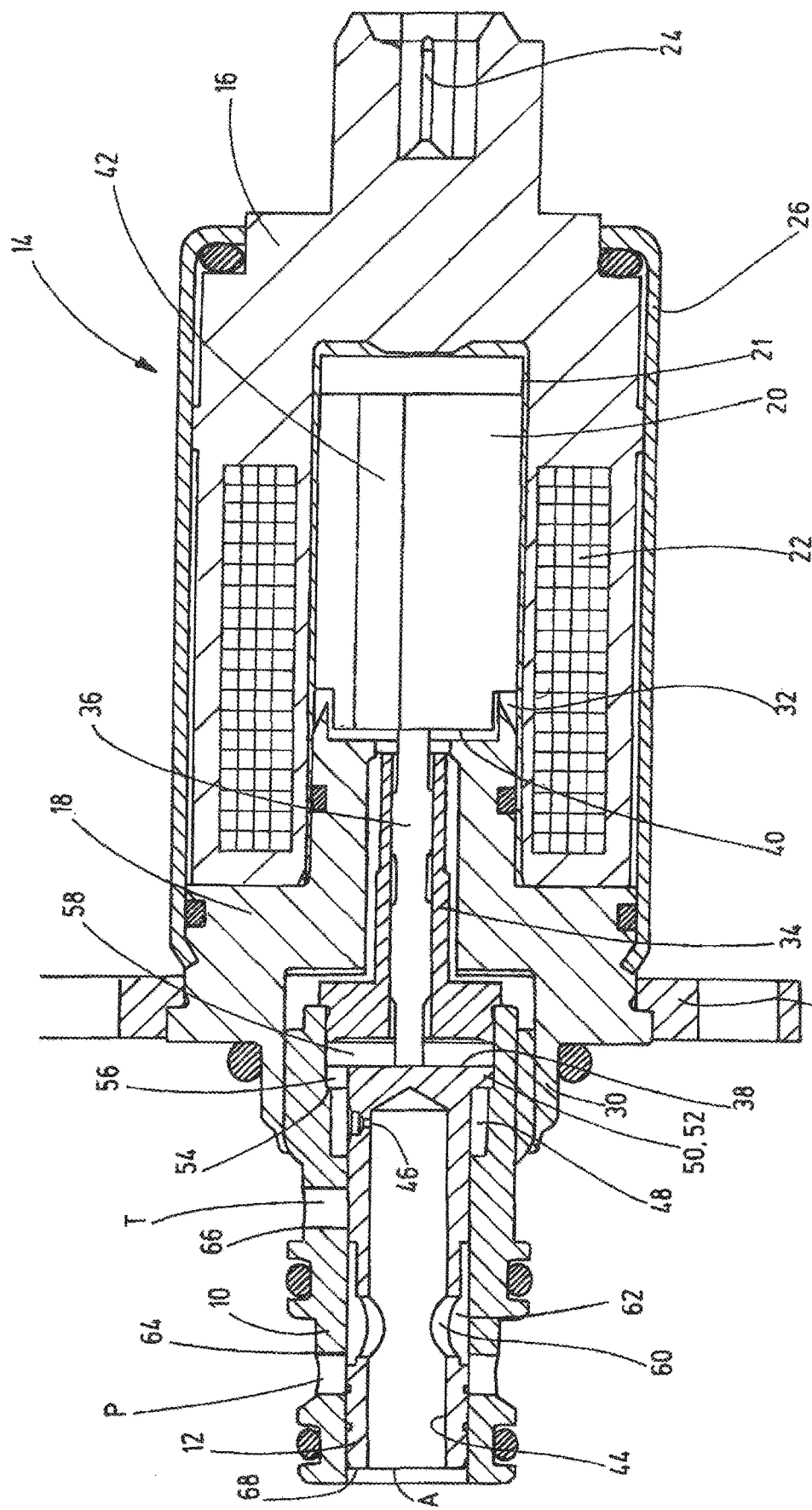
FIG. 1 is a side view in section of a valve according to the prior art.

FIG. 1 shows a longitudinal section depiction of a valve in the form of a proportional pressure control valve known from the prior art. The valve has a valve housing 10 with a valve piston 12, which is guided in a longitudinally displaceable manner in the housing 10. This valve piston 12 serves for alternately releasing and connecting a utility connection A to a pressure supply connection P or a tank connection T. The utility connection A is also referred to as a working connection in technical parlance. For the supply connection P, the term pump connection has also become generally accepted. The tank connection T need not necessarily lead to a supply tank; instead, this description is only intended to indicate that a relatively low pressure is applied at the connection T, for example a tank and/or ambient pressure. The utility connection or working connection A is mounted on the front face of the valve housing 10. Both the pressure supply connection or pump connection P and the tank connection T are individual radial bores introduced into the valve housing 10, which are kept at a predeterminable axial spacing from one another. This construction is standard, and it will therefore not be addressed in further detail here.

An actuating magnet 14 serves to actuate the valve piston 12. The actuating magnet 14 has a magnet housing 16, 18 formed in two parts, in which a keeper 20 is guided in a longitudinally displaceable manner inside a pressure sleeve 21. A coil winding 22, which is only schematically depicted, serves to actuate the keeper 20. The coil winding 22 is housed in the magnet housing part 16 and can be energized from the outside via a connector part 24. The connector part 24 forms, in the viewing direction of FIG. 1, the right final end of the magnet housing part 16. The two magnet housing parts 16, 18 are held together via a cap-shaped end housing 26. In the central region of the magnet housing part 18, a flange plate 28 is placed, which flange plate permits fixing the entire valve to a third component (not depicted in detail) for engaging the valve housing 10 in the manner of a cartridge in a corresponding recess of the third component. The third component naturally has to have corresponding fluid lines for the purpose of connection to the connections A, P, T in the valve housing 10. For the end-side fixing of the valve housing 10 to the magnet housing part 18, the housing part 18 has a projecting sleeve 30, in which a right end region of the valve housing 10 engages. A correspondingly flange at the free front-face of projecting sleeve 30 end fixes the valve housing 10 in the magnet housing part 18. In addition, the two magnet housing parts 16, 18 together form a magnetic separation 32 in the form of an air gap in order to obtain a targeted magnetic line conduction into the keeper 20, provided that the coil winding 22 is correspondingly energized during operation of the device or of the valve.

Introduced into the magnet housing part 18 is a longitudinal bore with a guide part 34 arranged in a stationary manner in the magnet housing part 18, which guide part is penetrated along its longitudinal bore by a control piston 36. The one free end of the control piston 36 abuts the rear side 38 of the valve piston 12. Its other free end abuts the adjacent opposite front side 40 of the keeper 20. A movement of the keeper 20 can then be transferred to the valve piston 12. Conversely, the valve piston 12 can transfer, in the case of a not energized coil winding 22, its movement direction via the control piston 36 to the keeper 20 for the shifting movement thereof. The keeper 20 is additionally provided with a longitudinal bore 42 in order to allow a pressure compensation in the spaces inside the magnet housing parts 16, 18, which the keeper 20 abuts at the front side, to prevent obstacles during the travelling operation of the keeper 20.

The guide part 34 broadens towards its one free end and to this extent forms a contact surface and connection surface with the front face of the valve housing 10, which is on the right side when viewed in the viewing direction of FIG. 1. In addition, the control piston 36, which is guided in the guide part 34, is formed with a reduced diameter in the direction of the rear side 38 of the valve piston 12 compared with the other piston parts of the control piston 36, which other piston parts are guided in the guide part 34 in the direction of the keeper 20.

As is additionally shown in FIG. 1, the valve piston 12 is drilled hollow, and thus, permits via its inner side or cavity 44 a permanent fluid-conducting connection between the utility connection A and an aperture 46, which radially penetrates the wall of the valve piston 12. The aperture 46 opens with its one free end into the inner side 44 of the valve piston 12 and with its other end opens into a control space 48. This control space 48 with a variable volume is delimited by the wall parts of the valve housing 10 and of the valve piston 12. In addition, the valve has a mechanical stroke limit or stop 50, including a stop 52 between the valve piston 12 and the valve housing 10. In the position of the valve piston 12 depicted in FIG. 1, the mechanical stroke limit 50 is "active", i.e., the valve piston 12 strikes or engages the valve housing 10 from right to left direction. In order to form this stop 52, the valve piston 12 is formed correspondingly broadened in a stepped manner at its free, right front side end, and the valve housing 10 itself is provided with a stepped taper 54 in this region.

In addition, the flange-shaped broadening of the valve piston 12 has at least one through hole 56 extending in the axial direction, which establishes a fluid- or media-conducting connection between the first control space 48 and an additional control space 58, which is also referred to hereafter as a third control space. This additional, third control space 58 with variable volume is on the one hand penetrated by the control piston 36 and is also delimited at the front side by the rear side 38 of the valve piston 12 and by the front face side of the broadened part of the guide 34. In the radial direction, the control space 58 is surrounded by inner wall parts of the valve housing 10 in this region. If, as depicted in FIG. 1, the valve piston 12 assumes its position contacting against the valve housing 10 by the mechanical stroke limit 50 (i.e., by contact of stop 52 with stepped taper 54), a fluid-conducting connection exists between the utility connection A and the pressure supply connection P, while the connection to the tank connection T is prevented.

The valve piston 12 also has a transverse channel 60, which can have a plurality of radial bores. By this transverse channel 60, the inner side 44 of the valve piston 12 is connected in a permanent fluid-conducting manner to an additional second control space 62 between the valve housing 10 and the valve piston 12. This control space 62 is guided in a longitudinally displaceable manner in the valve housing 10 together with the valve piston 12 and permits the respective fluid-conducting connection between the individual connections A, P, T or their separation from one another. The axial extension of the second control space 62 is selected such that in a displacement position of the valve piston 12, as is depicted by way of an example in FIG. 2, the valve piston 12 with its wall parts precisely covers the control edges 64, 66 at the connections P or T, which are formed by their wall parts of the valve housing 10. In addition, the valve piston 12 has at its one free end a pressure-effective surface 68, upon which the pressure in the utility connection A acts. As is additionally shown in FIG. 1, all mentioned parts are, if necessary, provided with corresponding sealing systems, which is known from the prior art and which are not addressed in further detail here.

The valve solution according to the invention shall now be explained in greater detail below with reference to FIGS. 2 and 3, to the extent that it differs from the known solution according to FIG. 1. The reference numerals introduced up to this point will also be used for the changed inventive solution. The differences will be explained only to the extent that they differ significantly from the above described prior art.

In addition to the already presented mechanical stroke limit 50, the solution according to the invention also has a hydraulic stroke limit 70 for the valve piston 12. For this purpose, a groove-shaped depression 72 is provided on the outer circumference of the valve piston 12. The width of depression 72 is selected such that, in the case of a floating state of the valve piston, a fluid-conducting connection is at least temporarily established between the first control space 48 and the tank connection T (cf. FIG. 3). This fluid-conducting connection is delimited by an additional third control edge 74 of the valve housing 10 as part of the hydraulic stroke stop 70, which can be traveled over by the valve piston 12 or its groove-shaped depression 72. This third control edge 74 is in turn formed by the wall of the respective radial bore for the tank connection T which, lying opposite the second control edge 66, is in turn delimited by its bore wall to the extent that it faces in the direction of the actuating magnet 14.

Figure 2:
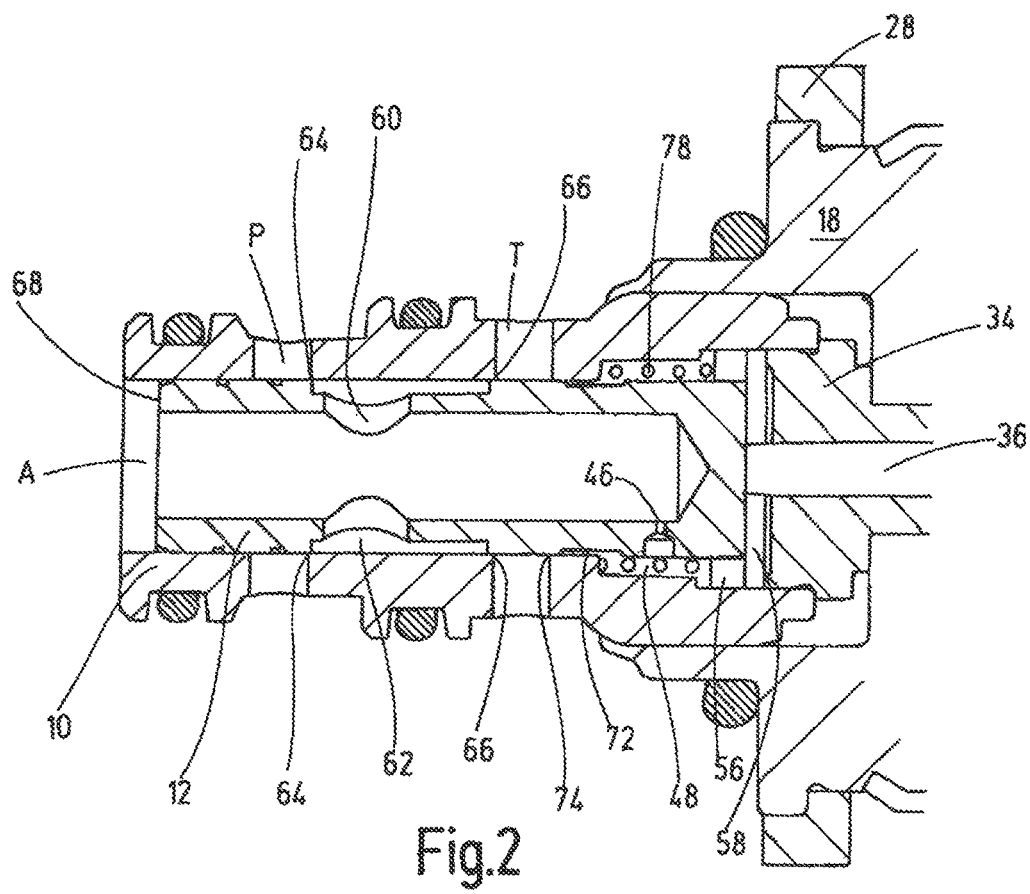
FIGS. 2 and 3 are partial, side views in section of a valve, in different functional positions, with a hydraulic stroke limit according to an exemplary embodiment of the invention in a valve according to FIG. 1.
Figure 3:
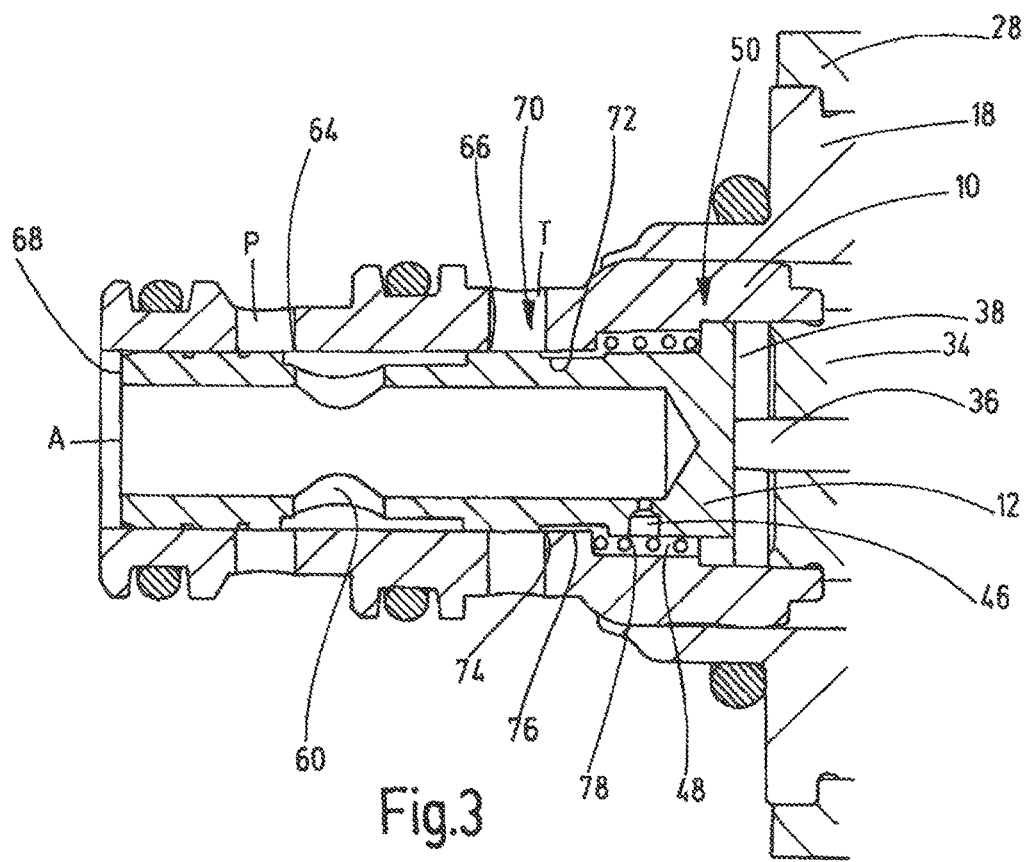

As is shown in particular in FIG. 2, and as explained above, in a central control position of the valve piston 12 and without an uptake volume in the direction of the utility connection A, the valve piston 12 just closes the pressure supply connection P and the tank connection T with their respective control edges 64 or 66. If, however, the valve is "operating" in the hydraulically controlled stroke limit, the groove-shaped depression 72 overlaps the valve housing projection 76 in an approximately central manner in this region and in this way then establishes the fluid-conducting connection between the tank connection T and the first control space 48. To support the functioning and operation of the valve piston 12 with its two stroke limits 50, 70, an energy store in the form of a compression spring 78 is arranged in the first control space 48. The compression spring is supported with its one free end on the front side end of the valve housing projection 76 and with its other end on the flange-shaped broadening of the valve piston 12 in the direction of its rear side 38.

For the sake of improved depiction and the comprehension of the interaction of the two stoke limits or stops 50, 70, a functional process using the valve according to the invention is disclosed below. As already explained, on starting the function, the coverage of the directional valve piston 12 should be achieved as quickly as possible, with the proportional valve then being briefly flowed through with a relatively large volume flow. At the time of this volume flow peak, the proportional valve piston 12 then controls as far as possible to the left side in the direction of viewing of the figures, with the entire supply at the utility connection A being ensured by the pressure supply connection P. In the possible left-hand end control position, the valve piston 12 then strikes, in accordance with the prior art, the mechanical stroke limit 50 in the form of the stop 52, resulting in the described negative consequences for the dither effect in the form of the respective dither signal.

As already disclosed, the valve according to the invention now has an additional control edge 74, which forms with the already mentioned additional components such as the aperture 46 and the groove-shaped depression 72 in the valve piston 12 of the hydraulic stroke limit 70. The arrangement in the valve piston 12 is then selected such that, in any case shortly before the mechanical stroke limit 50 is reached a fluid-conducting connection from the right-hand piston back space to the tank connection T of the valve is established by the groove-shaped depression 72, i.e., the first control space 48 is in a fluid-conducting connection with the tank connection T, with the control occurring by the third control edge 74 at the tank connection T. This fluid flow or oil flow between the first control space 48 and the tank connection T builds up a pressure difference at the aperture 46. During normal operation, the pressure on both piston front sides 68 and 38 of the valve piston 12 is equal, so that the aperture 46 then acts as damping for the movement of the valve piston 12. Shortly before the mechanical stroke limit 50 is reached, this balance is disturbed because the left piston side 68 is then subjected to a greater force than the right piston side 38 due to the aperture pressure drop. Because this force is greater than the magnetic force of the actuating magnet 14 in its actuating position, the valve piston 12 halts shortly before the mechanical stroke limit 50 is reached so that valve piston assumes a kind of floating position that results in all of the dither effect of the actuating magnet 14 being maintained. As illustrated in FIG. 3, the first control space 48 is connected in fluid communication to the tank connection T via the depression 72 in a first displacement position of the valve piston 12 in a floating state of the valve piston 12 such that the utility connection A is connected simultaneously to the pressure supply connection P via the inner cavity 44 and the transverse channel 60 and to the tank connection T via the inner cavity 44, the aperture 46, the first control space 48 and the depression 72 in the floating state of the valve piston 12. The first control space 48 is disconnected in fluid communication with the tank connection T in a second displacement position of the valve piston 12.

In the shut state and during normal operation with a balanced directional valve piston 12 of the work machine, the third control edge 74 of the hydraulic stroke limit 70 remains fully shut by the valve piston 12 (cf. FIG. 2), so that no leakage can occur in this region either.

The valve solution according to the invention then significantly improves the sensitivity and at the same time dynamic actuation behavior of hydraulically pilot-controlled directional valve pistons 12 by the use of the hydraulic stroke limit 70, which is in particular also the case with cold and thus highly viscous oil. The system-related advantage of little leakage in the shut state and with a balanced directional valve piston in its floating state is retained. There is no equivalent of this solution in the prior art.

While one embodiment has have been chosen to illustrate the invention, it will be understood by those skilled in the art that various changes and modifications can be made therein without departing from the scope of the invention as defined in the claims.

The invention claimed is:

1. A valve, comprising:
a valve housing having a utility connection, a pressure supply connection and a tank connection;
a valve piston longitudinally displaceable in said valve housing alternatively releasing and connecting said utility connection to said pressure supply connection or to said tank connection, said valve piston having an inner cavity opening on said utility connection and having a transverse channel extending from said inner cavity;
an actuating magnet coupled to and actuating longitudinal movement of said valve piston and producing a dither signal superimposed on an analog drive signal of said actuating magnet during operation causing vibration of said valve piston; and
a hydraulic stroke limit acting on said valve piston to maintain effects of the dither signal of said actuating magnet on said valve piston, said hydraulic stroke limit being formed by an aperture, being formed by a first control space and being formed by a depression on said valve piston extending from said first control space, said aperture being in said valve piston, being permanently connected to said utility connection via said inner cavity of said valve piston, and being open into said first control space between said valve piston and said valve housing, said first control space being connected in a fluid communication to said tank connection via said depression in a displacement position of said valve piston in a floating state of said valve piston such that said utility connection is connected simultaneously to said pressure supply connection via said inner cavity and said transverse channel and to said tank connection via said inner cavity, said aperture, said first control space and said depression in the floating state of said valve piston, said depression being groove-shaped, being on an outer circumference of said valve piston and having a width in a direction parallel to a longitudinal direction of said valve piston establishing a temporary connection in fluid communication of said first control space to said tank connection in the floating state of said valve piston, said temporary connection being delimited by a control edge of said valve housing as part of said hydraulic stroke limit.

2. A valve according to claim 1 wherein the valve is a proportional pressure control valve.

3. A valve according to claim 1 wherein a compression spring is housed in said first control space, has a first end supported on said valve housing and has a second end supported on said valve piston.

4. A valve according to claim 1 wherein a mechanical stroke limit including stops between said valve piston and said valve housing that engage when said piston is in a position preventing fluid communication between said utility connection and said tank connection and at least partially establishing said pressure supply connection and said utility connection.

5. A valve according to claim 1 wherein said valve piston is locatable in a central position in said valve housing without an uptake volume in a direction of said utility connection and just closes said pressure supply connection and said tank connection with respective control edges thereof in the central position.

6. A valve according to claim 1 wherein said valve piston comprises a transverse channel permanently connecting in fluid communication said inner cavity of said valve piston to a second control space between said valve housing and said valve piston, said second control space being longitudinally movable in said valve housing with said valve piston to establish or terminate fluid communication between said connections of said valve housing.

7. A valve according to claim 4 wherein a control piston of said actuating magnet acts on a rear side of said valve piston opposite said utility connection, said rear side facing and being movable in a third control space in said valve housing, said third control space being connected in fluid communication with said first control space when said stops of said mechanical stroke limit are separated from one another.

8. A valve according to claim 7 wherein said valve piston comprises a transverse channel permanently connecting in fluid communication said inner cavity of said valve piston to a second control space between said valve housing and said valve piston, said second control space being longitudinally movable in said valve housing with said valve piston to establish or terminate fluid communication between said connections of said valve housing; and
said valve piston comprises a free front side opposite said rear side thereof, said free front side having a control surface exposed to pressure at said utility connection.

9. A valve according to claim 1 wherein said valve housing is a cartridge.

10. A valve according to claim 1 wherein said first control space is disconnected in fluid communication with said tank connection in a second displacement position of said valve piston.

11. A valve, comprising:
a valve housing having a utility connection, a pressure supply connection and a tank connection;
a valve piston longitudinally displaceable in said valve housing alternatively releasing and connecting said utility connection to said pressure supply connection or to said tank connection, said valve piston having an inner cavity opening on said utility connection and having a transverse channel extending from said inner cavity;
an actuating magnet coupled to and actuating longitudinal movement of said valve piston and producing a dither signal superimposed on an analog drive signal of said actuating magnet during operation causing vibration of said valve piston; and
a hydraulic stroke limit acting on said valve piston to maintain effects of the dither signal of said actuating magnet on said valve piston, said hydraulic stroke limit being formed by an aperture, being formed by a first control space and being formed by a depression on said valve piston extending from said first control space, said aperture being in said valve piston, being permanently connected to said utility connection via said inner cavity of said valve piston, and being open into said first control space between said valve piston and said valve housing, said first control space being connected in a fluid communication to said tank connection via said depression in a first displacement position of said valve piston in a floating state of said valve piston such that said utility connection is connected simultaneously to said pressure supply connection via said inner cavity and said transverse channel and to said tank connection via said inner cavity, said aperture, said first control space and said depression in the floating state of said valve piston, said first control space being disconnected in fluid communication with said tank connection in a second displacement position of said valve piston.

12. A valve according to claim 11 wherein
the valve is a proportional pressure control valve.

13. A valve according to claim 11 wherein
a compression spring is housed in said first control space, has a first end supported on said valve housing and has a second end supported on said valve piston.

14. A valve according to claim 11 wherein
a mechanical stroke limit including stops between said valve piston and said valve housing that engage when said piston is in a position preventing fluid communication between said utility connection and said tank connection and at least partially establishing said pressure supply connection and said utility connection.

15. A valve according to claim 11 wherein
said valve piston is locatable in a central position in said valve housing without an uptake volume in a direction of said utility connection and just closes said pressure supply connection and said tank connection with respective control edges thereof in the central position.

16. A valve according to claim 11 wherein
said valve piston comprises a transverse channel permanently connecting in fluid communication said inner cavity of said valve piston to a second control space between said valve housing and said valve piston, said second control space being longitudinally movable in said valve housing with said valve piston to establish or terminate fluid communication between said connections of said valve housing.

17. A valve according to claim 14 wherein
a control piston of said actuating magnet acts on a rear side of said valve piston opposite said utility connection, said rear side facing and being movable in a third control space in said valve housing, said third control space being connected in fluid communication with said first control space when said stops of said mechanical stroke limit are separated from one another.

18. A valve according to claim 17 wherein
said valve piston comprises a transverse channel permanently connecting in fluid communication said inner cavity of said valve piston to a second control space between said valve housing and said valve piston, said second control space being longitudinally movable in said valve housing with said valve piston to establish or terminate fluid communication between said connections of said valve housing; and
said valve piston comprises a free front side opposite said rear side thereof, said free front side having a control surface exposed to pressure at said utility connection.

19. A valve according to claim 11 wherein
said valve housing is a cartridge.

* * * * *